(12) United States Patent
Lian et al.

(10) Patent No.: US 12,080,863 B2
(45) Date of Patent: Sep. 3, 2024

(54) VEHICLE AND POWER BATTERY HEATING APPARATUS AND METHOD THEREFOR

(71) Applicant: BYD COMPANY LIMITED, Guangdong (CN)

(72) Inventors: Yubo Lian, Shenzhen (CN); Heping Ling, Shenzhen (CN); Hua Pan, Shenzhen (CN); Yuxin Zhang, Shenzhen (CN); Hao Chen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 604 days.

(21) Appl. No.: 17/416,884

(22) PCT Filed: Dec. 20, 2019

(86) PCT No.: PCT/CN2019/127109
§ 371 (c)(1),
(2) Date: Jun. 21, 2021

(87) PCT Pub. No.: WO2020/125769
PCT Pub. Date: Jun. 25, 2020

(65) Prior Publication Data
US 2022/0080858 A1  Mar. 17, 2022

(30) Foreign Application Priority Data
Dec. 21, 2018 (CN) .......................... 201811574151.2

(51) Int. Cl.
*H01M 10/615* (2014.01)
*B60L 3/00* (2019.01)
(Continued)

(52) U.S. Cl.
CPC ......... *H01M 10/615* (2015.04); *B60L 3/0046* (2013.01); *B60L 58/27* (2019.02);
(Continued)

(58) Field of Classification Search
CPC .......... H01M 10/6571; H01M 10/425; H01M 10/486; B60L 58/27; B60L 3/0046
(Continued)

(56) References Cited

U.S. PATENT DOCUMENTS

2010/0050676 A1  3/2010  Takamatsu et al.
2010/0259207 A1* 10/2010  Kitanaka ................. H02P 21/22
318/400.17
(Continued)

FOREIGN PATENT DOCUMENTS

CN  102431465 A  5/2012
CN  102627073 A  8/2012
(Continued)

OTHER PUBLICATIONS

International Search Report and Written Opinion for Application No. PCT/CN2019/127109, mailed on Mar. 19, 2020, 10 pages.

*Primary Examiner* — Pamela H Weiss
*Assistant Examiner* — John S Medley

(57) ABSTRACT

This application provides a vehicle and a power battery heating apparatus and method thereof. In the method, when a current temperature value of a power battery is lower than a preset temperature value, and a heating condition of the power battery meets a preset condition, a three-phase inverter is controlled to cause a three-phase alternating current motor to generate heat to heat a coolant flowing through the power battery. A preset quadrature-axis current and a corresponding preset direct-axis current are obtained to control the three-phase inverter to adjust a phase current of the three-phase alternating current motor in the heating process, so that electromagnetic torque with a small torque value is outputted at a motor shaft. The electromagnetic torque causes the motor output shaft to output a pre-tightening force to the transmission mechanism, thereby (Continued)

eliminating an engagement gap and effectively avoiding jitters of the vehicle.

18 Claims, 4 Drawing Sheets

(51) Int. Cl.
*B60L 58/27* (2019.01)
*H01M 10/42* (2006.01)
*H01M 10/48* (2006.01)
*H01M 10/613* (2014.01)
*H01M 10/625* (2014.01)
*H01M 10/6571* (2014.01)

(52) U.S. Cl.
CPC ....... *H01M 10/425* (2013.01); *H01M 10/486* (2013.01); *H01M 10/613* (2015.04); *H01M 10/625* (2015.04); *H01M 10/6571* (2015.04); *B60L 2240/545* (2013.01)

(58) Field of Classification Search
USPC .......................................................... 429/62
See application file for complete search history.

(56) References Cited

U.S. PATENT DOCUMENTS

| | | | | |
|---|---|---|---|---|
| 2012/0200241 | A1* | 8/2012 | Kojima | B60L 58/25 318/139 |
| 2013/0338871 | A1* | 12/2013 | Kubo | B60L 58/18 701/29.2 |
| 2014/0012447 | A1 | 1/2014 | Gao et al. | |
| 2016/0152151 | A1 | 6/2016 | Yang et al. | |
| 2017/0174039 | A1 | 6/2017 | Schedel et al. | |
| 2019/0363408 | A1 | 11/2019 | Dan et al. | |
| 2023/0062270 | A1* | 3/2023 | Li | H01M 10/615 |
| 2023/0163378 | A1* | 5/2023 | Wang | H01M 10/425 318/139 |

FOREIGN PATENT DOCUMENTS

| | | | |
|---|---|---|---|
| CN | 103419665 A | 12/2013 | |
| CN | 103560304 A | 2/2014 | |
| CN | 104249629 A | 12/2014 | |
| CN | 104767447 A | 7/2015 | |
| CN | 105539423 A | 5/2016 | |
| CN | 106160615 A | 11/2016 | |
| CN | 106347067 A | 1/2017 | |
| CN | 207021363 U | 2/2018 | |
| CN | 108306078 A | 7/2018 | |
| CN | 108736108 A | 11/2018 | |
| DE | 102012201574 A1 | 9/2012 | |
| DE | 102014011828 A1 | 2/2016 | |
| EP | 3123554 A4 | 5/2017 | |
| JP | 2007-028702 A | 2/2007 | |
| JP | 2008-189249 A | 8/2008 | |
| JP | 2010-272395 A | 12/2010 | |
| JP | 2012165526 A | 8/2012 | |
| JP | 2012-166722 A | 9/2012 | |
| JP | 2013133061 A * | 7/2013 | .............. B60L 11/18 |
| JP | 5259752 B2 | 8/2013 | |
| JP | 2015-080308 A | 4/2015 | |
| KR | 101551068 B1 | 9/2015 | |
| WO | 2013/174278 A1 | 11/2013 | |
| WO | WO-2016200144 A1 * | 12/2016 | .......... B60L 11/1874 |

* cited by examiner

VEHICLE AND POWER BATTERY HEATING APPARATUS AND METHOD THEREFOR

CROSS-REFERENCE TO RELATED APPLICATIONS

This application is a National Phase Application of International Patent Application No. PCT/CN2019/127109, filed on Dec. 20, 2019, which is based on and claims priority to and benefits of Chinese Patent Application No. 201811574151.2, filed on Dec. 21. 2018, and entitled "VEHICLE AND POWER BATTERY HEATING APPARATUS AND METHOD THEREFOR". The entire content of all of the above identified applications is incorporated herein by reference.

FIELD

This application relates to the field of vehicle technologies, and in particular, to a vehicle and a power battery heating apparatus and method thereof.

BACKGROUND

In recent years, with the vigorous development of new-energy vehicles, a lithium-ion based power battery is widely applied. However, due to inherent characteristics of the battery, charging and discharging capabilities of the power battery are significantly reduced at low temperature, which affects use of the vehicles in a cold region.

To resolve such a problem, in the related art, the temperature of the power battery is obtained in real time mainly by using a temperature sensor, and when the temperature of the power battery meets a preset condition, a motor is controlled by using energy provided by the power battery, to run at zero torque, thereby heating the power battery. However, by using the method, although the power battery can be heated, the motor needs to be controlled to output zero torque, that is, a torque current is controlled to be zero. A key to control the torque current to be zero is to accurately obtain a zero position of a motor. However, in actual situations, limited to the accuracy of a motor zero position calibration method, it is difficult to obtain the zero position of the motor, and a good sampling precision of a three-phase current sensor is difficult to be ensured when a current amplitude value is relatively small. In this case, the torque current is not always zero, but oscillates around zero, causing the vehicle jitters and a bad driving experience.

In conclusion, an existing power battery heating method easily leads to a problem of vehicle jitters.

SUMMARY

This application provides a vehicle and a power battery heating apparatus and a method thereof, to resolve a problem that a power battery heating method easily leads to a problem of vehicle jitters.

This application is implemented as follows. A first aspect of this application provides a power battery heating method. The power battery heating method is configured for heating a power battery of a vehicle, and includes:

obtaining a current temperature value of the power battery, determining that the current temperature value of the power battery is lower than a preset temperature value, and determining that a heating condition of the power battery meets a preset condition;

obtaining heating power of the power battery;

obtaining a preset quadrature-axis current, and obtaining a corresponding preset direct-axis current according to the heating power of the power battery, where a value of the obtained preset quadrature-axis current is a quadrature-axis current value that causes a torque value outputted by a three-phase alternating current motor to fall within a target range, and the target range does not include zero; and controlling an on/off status of a power device in a three-phase inverter, so that the three-phase alternating current motor generates heat according to heating energy provided by a heating energy source, to heat a coolant flowing through the power battery, and controlling, according to the preset direct-axis current and the preset quadrature-axis current, the three-phase inverter to adjust a phase current of the three-phase alternating current motor in the heating process.

A second aspect of this application provides a power battery heating apparatus. The power battery heating apparatus is configured to heat a power battery of a vehicle, and includes:

a three-phase inverter, connected to a positive electrode and a negative electrode of a heating energy source configured to provide heating energy;

a three-phase alternating current motor, where three phase coils of the three-phase alternating current motor are connected to three phase legs of the three-phase inverter; and a control module, where the control module is respectively connected to the three-phase inverter and the three-phase alternating current motor, and is configured to: obtain a current temperature value of the power battery, determine that the current temperature value of the power battery is lower than a preset temperature value, determine that a heating condition of the power battery meets a preset condition, and obtain heating power of the power battery; obtain a preset quadrature-axis current, and obtain a corresponding preset direct-axis current according to the heating power of the power battery, where a value of the obtained preset quadrature-axis current is a quadrature-axis current value that causes a torque value outputted by the three-phase alternating current motor to fall within a target range, and the target range does not include zero; and control an on/off status of a power device in the three-phase inverter, so that the three-phase alternating current motor generates heat according to the heating energy provided by the heating energy source, to heat a coolant flowing through the power battery, and control, according to the preset direct-axis current and the preset quadrature-axis current, the three-phase inverter to adjust a phase current of the three-phase alternating current motor in the heating process.

A third aspect of this application provides a vehicle, where the vehicle includes the power battery heating apparatus in the second aspect, and further includes a power battery, a coolant tank, a pump, and a water pipeline, the pump inputs a coolant in the coolant tank into the water pipeline according to a control signal, and the water pipeline passes through the power battery and the power battery heating apparatus.

This application provides a vehicle and a power battery heating apparatus and method thereof. In the power battery heating method, when determining that a current temperature value of a power battery is lower than a preset temperature value, and a heating condition of the power battery meets a preset condition, a three-phase inverter is controlled to cause a three-phase alternating current motor to generate heat according to heating energy, to heat a coolant flowing through the power battery. A preset quadrature-axis current that causes a torque value outputted by the motor to be an appropriate value is obtained, and a corresponding preset direct-axis current is obtained according to heating power of the power battery, to control, according to the preset direct-axis current and the preset quadrature-axis current, the three-phase inverter to adjust a phase current of the three-phase alternating current motor in the heating process, so that electromagnetic torque with a relatively small torque value is outputted at a motor shaft. The electromagnetic torque cannot cause the vehicle to move, also cannot cause a damage to parts and components of a transmission mechanism of the vehicle. It only causes the motor output shaft to output a pre-tightening force to the transmission mechanism, thereby eliminating an engagement gap and effectively avoiding jitter of the vehicle.

BRIEF DESCRIPTION OF THE DRAWINGS

To describe the technical solutions of the embodiments of this application more clearly, the following briefly introduces the accompanying drawings required for describing the embodiments or the related art. Apparently, the accompanying drawings in the following description show only some embodiments of this application, and a person of ordinary skill in the art may still derive other drawings according to the accompanying drawings without creative efforts.

DETAILED DESCRIPTION

To make the objectives, technical solutions, and advantages of this application clearer and more understandable, this application is further described in detail below with reference to the accompanying drawings and the embodiments. It should be understood that the specific embodiments described herein are merely used to explain this application but are not intended to limit this application.

To describe technical solutions in this application, the following provides descriptions by using specific embodiments.

Figure 1:
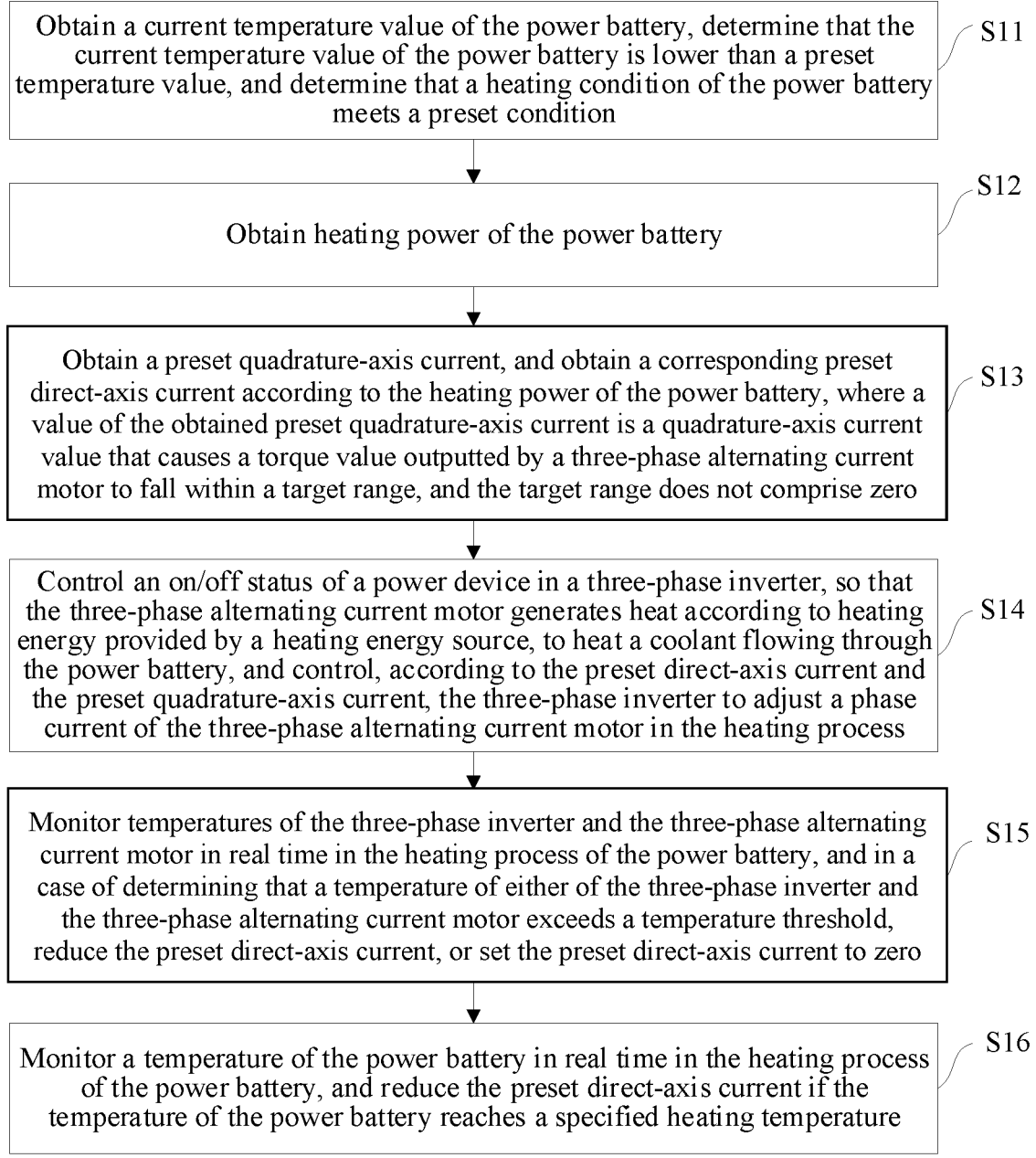
FIG. 1 is a schematic flowchart of a power battery heating method according to an embodiment of the present disclosure.

An embodiment of the present disclosure provides a power battery heating method. The power battery heating method is configured for heating a power battery of a vehicle. In a heating process, a heat conduction path of the power battery is connected to and in communication with a heat conduction loop of a motor of the vehicle, to form a heat conduction loop. As shown in FIG. 1, the power battery heating method includes the following steps.

Step S11. Obtain a current temperature value of the power battery, determine that the current temperature value of the power battery is lower than a preset temperature value, and determine that a heating condition of the power battery meets a preset condition.

In the embodiments of this application, in a cold environment, when the vehicle is not used for a long time, a temperature of the power battery approaches an ambient temperature. With the decrease of the temperature, the performance of the power battery is further reduced, thereby limiting charging and discharging capabilities and further affecting the performance and use of the vehicle. Therefore, the power battery needs to be heated. However, before the power battery is heated, a current temperature value of the power battery needs to be obtained, and the temperature value is compared with a preset temperature value. If the current temperature value is lower than the preset temperature value, whether a heating condition of the battery meets a preset condition is further determined.

Specifically, in an implementation of this application, the determining whether a heating condition of the power battery meets a preset condition in step S11 specifically includes:

when determining that a current working status of the motor is a non-driving state, and determining that a fault status of the power battery, a fault status of the three-phase alternating current motor, a fault status of a motor controller, and a fault status of a heat conduction loop all indicate that no fault exists, identifying that the heating condition of the power battery meets the preset condition; and when determining that the current working status of the motor is a driving state, or determining that any fault status in the fault status of the power battery, the fault status of the three-phase alternating current motor, the fault status of the motor controller, and the fault status of the heat conduction loop indicates that there is a fault, identifying that the heating condition of the power battery does not meet the preset condition.

In the embodiments of this application, when determining whether a heating condition of the power battery meets a preset condition, a current working status of the motor of the vehicle, whether a fault occurs in the power battery, whether a fault occurs in the three-phase alternating current motor, whether a fault occurs in a motor controller, and whether a fault occurs in a heat conduction loop specifically need to be determined. If the current working status of the motor is a non-driving state, and no fault occurs in the power battery, the three-phase alternating current motor, the motor controller, and the heat conduction loop, it indicates that the power battery may be heated. If the current working status of the motor is a driving state, or a fault occurs in any one of the power battery, the three-phase alternating current motor, the motor controller, and the heat conduction loop, it indicates that the power battery may not be heated. It should be noted that in the embodiments of the present disclosure, that a fault occurs in the heat conduction loop includes, but is not limited to, a problem such as a damage in a communication valve or an insufficient medium in the heat conduction loop.

Further, in an implementation of this application, the power battery heating method further includes:

obtaining gear position information and motor speed information, and obtaining the current working status of the motor according to the gear position information and the motor speed information.

Specifically, when it is determined that a current gear position is a P gear position, and a motor speed is zero, it indicates that the current working status of the motor is a non-driving state. When it is determined that the current gear position is not the P gear position, or the motor speed is not zero, it indicates that the current working status of the motor is a driving state.

In this implementation, gear position information and motor speed information are obtained, and the current working status of the motor is obtained according to the gear position information and the motor speed information. Therefore, when whether the heating condition of the power battery meets a preset condition is determined subsequently according to the working status of the motor, the gear position information and the motor speed information may be used for determination. When any of the conditions is not met, the power battery cannot be heated, to prevent heating the power battery when the vehicle is in a normal traveling state, thereby avoiding affecting the performance of the vehicle.

Step S12. Obtain heating power of the power battery.

In the embodiments of this application, when it is determined that the heating condition of the power battery meets a preset condition, that is, the power battery may be heated, heating power of the power battery needs to be obtained. The heating power refers to power required for heating the power battery.

Step S13. Obtain a preset quadrature-axis current, and obtain a corresponding preset direct-axis current according to the heating power of the power battery, where a value of the obtained preset quadrature-axis current is a quadrature-axis current value that causes a torque value outputted by a three-phase alternating current motor to fall within a target range, and the target range does not include zero.

In the embodiments of this application, after the power required for heating the power battery is obtained, a preset direct-axis current id and a preset quadrature-axis current iq further need to be obtained. The preset direct-axis current id may be obtained through searching according to the previously obtained heating power of the power battery. That is, there is a mapping relationship between the heating power of the power battery and the preset direct-axis current id. After the heating power of the power battery is obtained, the corresponding preset direct-axis current id may be found according to the heating power. In addition, during obtaining the preset quadrature-axis current iq, the three-phase alternating current motor may output a very small torque value according to the obtained preset quadrature-axis current iq. The torque cannot cause the vehicle to move, and also cannot cause a damage to parts and components of a transmission mechanism of the vehicle. The smaller output torque is provided to generate a pre-tightening force between gears of the transmission mechanism of the vehicle. The preset quadrature-axis current iq may be obtained through many experiments.

Step S14. Control an on/off status of a power device in a three-phase inverter, so that the three-phase alternating current motor generates heat according to heating energy provided by a heating energy source to heat a coolant flowing through the power battery, and control, according to the preset direct-axis current and the preset quadrature-axis current, the three-phase inverter to adjust a phase current of the three-phase alternating current motor in the heating process.

In the embodiments of the present disclosure, the heating energy source may be an external charging device, such as a charging pile, or may be the power battery, which is not limited herein.

Further, after the preset direct-axis current id and the preset quadrature-axis current iq are obtained, an on/off status of a power device in a three-phase inverter may be controlled, that is, an on/off time of the power device in the three-phase inverter, such as times required for switching on and switching off the power device, is controlled, so that the three-phase alternating current motor generates heat according to heating energy, to heat a coolant flowing through the power battery. During the heating process, according to the preset direct-axis current id and the preset quadrature-axis current iq, the three-phase inverter is controlled to adjust a phase current of the three-phase alternating current motor, thereby adjusting the heating power.

Specifically, in the embodiments of the present disclosure, when the three-phase inverter is controlled according to the preset direct-axis current id and the preset quadrature-axis current iq to adjust the phase current of the three-phase alternating current motor, a current three-phase current value and position and angle information of a motor rotor of the three-phase alternating current motor need to be obtained before the power battery is heated. The current three-phase current value is converted into a direct-axis current and a quadrature-axis current according to the position and angle information of the motor rotor. During the heating process, according to the direct-axis current, the quadrature-axis current, the preset direct-axis current, and the preset quadrature-axis current, the three-phase inverter is controlled to adjust the phase current of the three-phase alternating current motor, thereby heating the power battery and ensuring that a smaller torque value is outputted at a motor shaft.

In this implementation, parameters such as a three-phase current value and position and angle information of a motor rotor of the three-phase alternating current motor before the heating are obtained, to obtain a direct-axis current and a quadrature-axis current according to the obtained parameters, to facilitate controlling the three-phase inverter according to the direct-axis current, the quadrature-axis current, the preset direct-axis current, and the preset quadrature-axis current to adjust the phase current of the three-phase alternating current motor in the heating process, thereby adjusting the heating power.

Further, in an implementation of the present disclosure, a specific process of obtaining the direct-axis current and the quadrature-axis current according to the position and angle information of the motor rotor and the current three-phase current value is:

before the power battery is heated, after the current three-phase current value and the position and angle information of the motor rotor of the three-phase alternating current motor are obtained, transforming the current three-phase current value from a natural coordinate system to a static coordinate system, and converting the current three-phase current value in the static coordinate system into a direct-axis current and a quadrature-axis current in a synchronous rotating coordinate system according to the position and angle information of the motor rotor.

In this implementation, the current three-phase current value is transformed from a natural coordinate system to a static coordinate system, and the current three-phase current value in the static coordinate system is converted into a direct-axis current and a quadrature-axis current in a synchronous rotating coordinate system according to the position and angle information of the motor rotor. The three-phase inverter may be controlled according to the obtained direct-axis current and quadrature-axis current to adjust the phase current of the three-phase alternating current motor based on the standard of the same coordinate system, thereby improving the accuracy of the adjustment process.

Further, in an implementation of the present disclosure, after the direct-axis current and the quadrature-axis current are obtained, the direct-axis current and the quadrature-axis current are respectively compared with the preset direct-axis current id and the preset quadrature-axis current iq, to adjust the direct-axis current and the quadrature-axis current according to the preset direct-axis current id and the preset quadrature-axis current iq, thereby controlling the three-phase inverter according to the preset direct-axis current id and the preset quadrature-axis current iq. After the direct-axis current and the quadrature-axis current are adjusted according to the preset direct-axis current id and the preset quadrature-axis current iq, a direct-axis voltage Ud and a quadrature-axis voltage Uq may be obtained according to data obtained by decoupling an adjustment result. After the direct-axis voltage Ud and the quadrature-axis voltage Uq are obtained, coordinate transformation is performed on the direct-axis voltage Ud and the quadrature-axis voltage Uq to obtain a first voltage $U_\alpha$ and a second voltage $U_\beta$, so as to obtain a switching signal according to the first voltage $U_\alpha$ and the second voltage $U_\beta$, thereby controlling the three-phase inverter according to the switching signal to adjust the phase current of the three-phase alternating current motor.

In this implementation, the obtained direct-axis current and quadrature-axis current are adjusted according to the preset direct-axis current and the preset quadrature-axis current, to obtain a corresponding adjustment result. A series of changes are performed on the adjustment result, to obtain a switching signal of the three-phase inverter, that is, an on/off time of the power device in the three-phase inverter. The three-phase inverter is controlled according to the switching signal to adjust the phase current of the three-phase alternating current motor, to implement closed-loop control of the three-phase alternating current motor and adjust the heating power, thereby improving the effectiveness in the heating process of the power battery and reducing wear and tear of parts and components such as the motor.

Step S15. Monitor temperatures of the three-phase inverter and the three-phase alternating current motor in real time in the heating process of the power battery, and when determining that a temperature of either of the three-phase inverter and the three-phase alternating current motor exceeds a temperature threshold, reduce the preset direct-axis current, or set the preset direct-axis current to zero.

In the embodiments of this application, in the heating process of the power battery, any device may be damaged when an excessively high temperature. Therefore, temperatures of the three-phase alternating current motor and the power device in the three-phase inverter need to be monitored in real time. If it is detected that a temperature of either one of the three-phase inverter and the three-phase alternating current motor exceeds a temperature threshold, a current amplitude value of the preset direct-axis current id is reduced or the preset direct-axis current id is set to zero.

In the embodiments of this application, if it is determined that the temperature of either of the three-phase inverter and the three-phase alternating current motor exceeds the temperature threshold, the power battery heating method further includes: setting the preset quadrature-axis current to zero.

In this implementation, in the heating process of the power battery, temperatures of the three-phase inverter and the three-phase alternating current motor are monitored in real time, so that when a temperature of either one of the three-phase inverter and the three-phase alternating current motor exceeds a temperature threshold, the preset direct-axis current id is reduced, or the preset direct-axis current id and the preset quadrature-axis current iq are set to zero, and values of phase currents flowing through three phase windings of the three-phase alternating current motor are also reduced or become zero. In this way, the heating power of the motor is reduced, and thus a temperature of a power unit in the three-phase inverter and temperatures of the three phase windings of the three-phase alternating current motor are reduced, so that all the parts and components of the vehicle are not damaged while ensuring the heating effect.

Step S16. Monitor a temperature of the power battery in real time in the heating process of the power battery, and reduce the preset direct-axis current if the temperature of the power battery reaches a specified heating temperature.

In the embodiments of the present disclosure, when a temperature of the power battery reaches a specified heating temperature, it indicates that there is no need to heat the power battery. In this case, it needs to stop heating the power battery, that is, reduce the preset direct-axis current id, until the preset direct-axis current id is reduced to zero.

In this implementation, a temperature of the power battery is monitored in real time in the heating process, and when the temperature of the power battery reaches a specified heating temperature, the preset direct-axis current id is reduced, to effectively avoid overheating of the power battery, and avoid a damage to the power battery, thereby prolonging the service life of the power battery.

Further, in an implementation of this application, the power battery heating method further includes:

obtaining required heating power of the power battery in real time in the heating process of the power battery, and adjusting a value of the preset direct-axis current according to the required heating power.

In the embodiments of this application, the adjusting a value of the preset direct-axis current according to the required heating power refers to adjusting heating power according to a difference between a preset target heating temperature and a current temperature of the power battery. A larger difference indicates larger heating power, and larger power indicates a larger amplitude value of the preset direct-axis current. Specifically, when larger power is required, that is, a current battery temperature of the power battery is lower, for example, when a difference between the current temperature and a target temperature that needs to be reached during heating exceeds 10° C., heating is performed by using larger power. In this case, an amplitude value of the preset direct-axis current id is increased. When lower power is required, that is, a current battery temperature of the power battery is higher, for example, when a difference between the current temperature and a target temperature that needs to be reached during heating is less than 10° C., heating is performed by using lower power. In this case, an amplitude value of the preset direct-axis current id is reduced.

In this implementation, required heating power of the power battery is obtained in real time in the heating process, and the preset direct-axis current id and the preset quadrature-axis current iq are adjusted according to the required heating power, to effectively avoid overheating of the power battery, and avoid a damage to the power battery, thereby prolonging the service life of the power battery.

Further, in an implementation of the present disclosure, the power battery heating method further includes:

setting the preset direct-axis current to zero when determining that any one of fault status in the fault status of the power battery, the fault status of the three-phase alternating current motor, the fault status of the motor controller, and the fault status of the heat conduction loop indicates that there is a fault.

In the embodiments of the present disclosure, when determining that any one of fault status in the fault status of the power battery, the fault status of the three-phase alternating current motor, the fault status of the motor controller, and the fault status of the heat conduction loop indicates that there is a fault, it indicates that the power battery cannot be heated, and heating of the power battery should be stopped, that is, the preset direct-axis current is set to zero.

When determining that any one of fault status in the fault status of the power battery, the fault status of the three-phase alternating current motor, the fault status of the motor controller, and the fault status of the heat conduction loop indicates that there is a fault, the power battery heating method further includes: setting the preset quadrature-axis current to zero.

In this implementation, when determining that any one of fault status in the fault status of the power battery, the fault status of the three-phase alternating current motor, the fault status of the motor controller, and the fault status of the heat conduction loop indicates that there is a fault, heating of the power battery is stopped, to effectively avoid a damage to the power battery, thereby prolonging the service life of the power battery.

Figure 2:
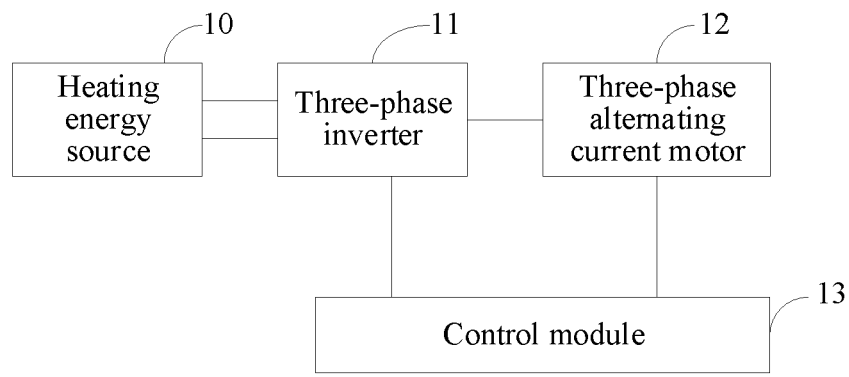
FIG. 2 is a schematic structural diagram of a power battery heating apparatus according to an embodiment of the present disclosure.

An embodiment of this application provides a power battery heating apparatus of a vehicle, configured to heat a power battery of a vehicle. As shown in FIG. 2, the power battery heating apparatus includes:

a three-phase inverter 11, connected to a positive electrode and a negative electrode of a heating energy source 10 configured to provide heating energy;

a three-phase alternating current motor 12, where three phase coils of the three-phase alternating current motor 12 are connected to three phase legs of the three-phase inverter 11; and a control module 13, where the control module 13 is respectively connected to the three-phase inverter 11 and the three-phase alternating current motor 12, and is configured to obtain a current temperature value of the power battery, determine that the current temperature value of the power battery is lower than a preset temperature value, and determine that a heating condition of the power battery meets a preset condition, and obtain heating power of the power battery. The control module 13 is further configured to obtain a preset quadrature-axis current iq, and obtain a corresponding preset direct-axis current id according to the heating power of the power battery, where a value of the obtained preset quadrature-axis current iq is a quadrature-axis current value that causes a torque value outputted by the three-phase alternating current motor 12 to fall within a target range, and the target range does not include zero.

The control module 13 is further configured to control an on/off status of a power device in the three-phase inverter 11, so that the three-phase alternating current motor 12 generates heat according to the heating energy provided by the heating energy source 10, to heat a coolant flowing through the power battery, and control, according to the preset direct-axis current id and the preset quadrature-axis current iq, the three-phase inverter 11 to adjust a phase current of the three-phase alternating current motor 12 in the heating process.

The heating energy source 10 may be implemented by using an external power supply device such as a charging pile, or may be the power battery itself. That is, the heating energy provided by the heating energy source 10 may be outputted by the power battery, or may be outputted by a direct current charger, or may be outputted by an alternating current charger after rectifying, which is not specifically limited herein. The three-phase inverter 11 has four working modes, which is determined by the control module 13. When configured to drive the vehicle, the three-phase inverter 11 works in an inverter mode; when configured to boost for charging, the three-phase inverter 11 works in a boost mode; when configured to heat a battery, the three-phase inverter 11 works in a heating mode; and when needing to supply power to the outside, the three-phase inverter 11 works in a changing voltage mode. Only a case in which the three-phase inverter 11 works in the heating mode is described in detail in the embodiments of this application. The three-phase inverter 11 includes six power switching units. The power switch may be a transistor, an IGBT, or a MOS transistor, or other device types. Two power switching units form a phase leg, and a total of three phase legs are formed. A connecting point between two power switching units on each phase leg is connected to a phase coil in the three-phase alternating current motor 12. The three-phase alternating current motor 12 includes three phase coils, and the three phase coils are connected to one midpoint. The three-phase alternating current motor 12 may be a permanent magnet synchronizing motor, an asynchronous motor, or the like. A type of the three-phase alternating current motor is not specifically limited in this application.

Figure 3:
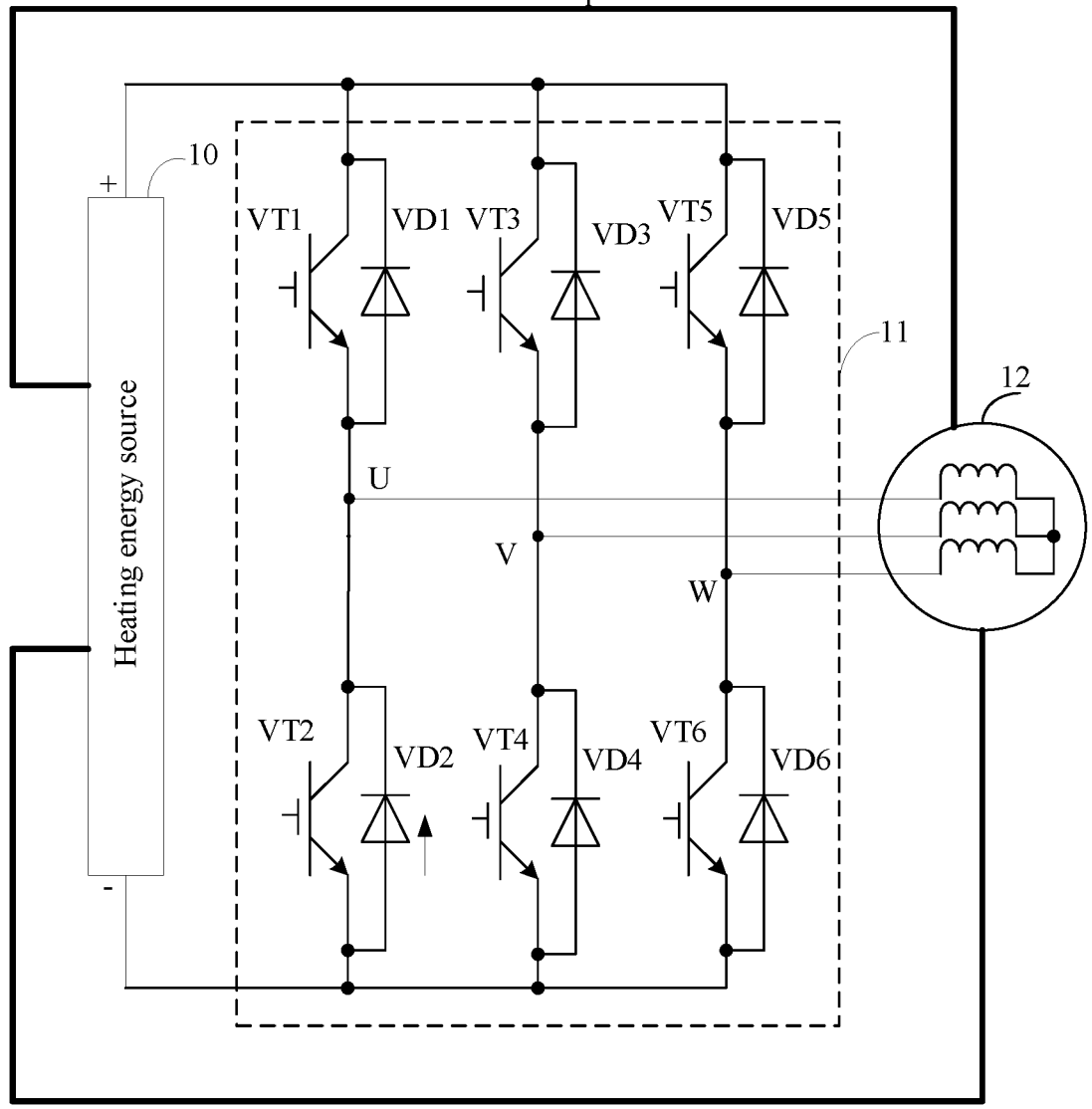
FIG. 3 is a circuit diagram of a power battery heating apparatus according to an embodiment of the present disclosure.

Specifically, in an implementation of this application, as shown in FIG. 3 (to help understand a working principle of a circuit, a portion of the control module 13 is omitted in FIG. 3), the three-phase inverter 11 includes a first power switching unit, a second power switching unit, a third power switching unit, a fourth power switching unit, a fifth power switching unit, and a sixth power switching unit. A control terminal of each power switching unit is connected to the control module 13 (not shown in the figure), first terminals of the first power switching unit, the third power switching unit, and the fifth power switching unit are connected together, and second terminals of the second power switching unit, the fourth power switching unit, and the sixth power switching unit are connected together. A first phase coil of the three-phase alternating current motor 12 is connected to a second terminal of the first power switching unit and a first terminal of the second power switching unit, a second phase coil of the three-phase alternating current motor 12 is connected to a second terminal of the third power switching unit and a first terminal of the fourth power switching unit, and a third phase coil of the three-phase alternating current motor 12 is connected to a second terminal of the fifth power switching unit and a first terminal of the sixth power switching unit.

Further, the first power switching unit and the second power switching unit in the three-phase inverter 11 form a first phase leg (U-phase leg), the third power switching unit and the fourth power switching unit form a second phase leg (V-phase leg), and the fifth power switching unit and the sixth power switching unit form a third phase leg (W-phase leg). The first power switching unit includes a first upper leg VT1 and a first upper diode VD1, the second power switching unit includes a second lower leg VT2 and a second lower diode VD2, the third power switching unit includes a third upper leg VT3 and a third upper diode VD3, the fourth power switching unit includes a fourth lower leg VT4 and a fourth lower diode VD4, the fifth power switching unit includes a fifth upper leg VT5 and a fifth upper diode VD5, and the sixth power switching unit includes a sixth lower leg VT6 and a sixth lower diode VD6. The three-phase alternating current motor 12 may be a permanent magnet synchronizing motor or an asynchronous motor, and the three phase coils of the motor are respectively connected to upper legs and lower legs of the U, V, and W phases in the three-phase inverter.

Further, in an implementation of this application, the control module 13 may include a vehicle control unit, a control circuit of a motor controller, and a battery management system (BMS) circuit, which are connected by using a CAN bus. Different modules in the control module 13 control, according to obtained information, switching-on and switching-off of switching units in the three-phase inverter 11, to implement conduction of different current loops. The heating energy source 10, the three-phase inverter 11, and the three-phase alternating current motor 12 are provided with coolant tubes that are connected with each other. A coolant flows through the coolant tubes, and a temperature of the power battery may be adjusted by adjusting the temperature of the coolant in the coolant tubes.

Figure 4:
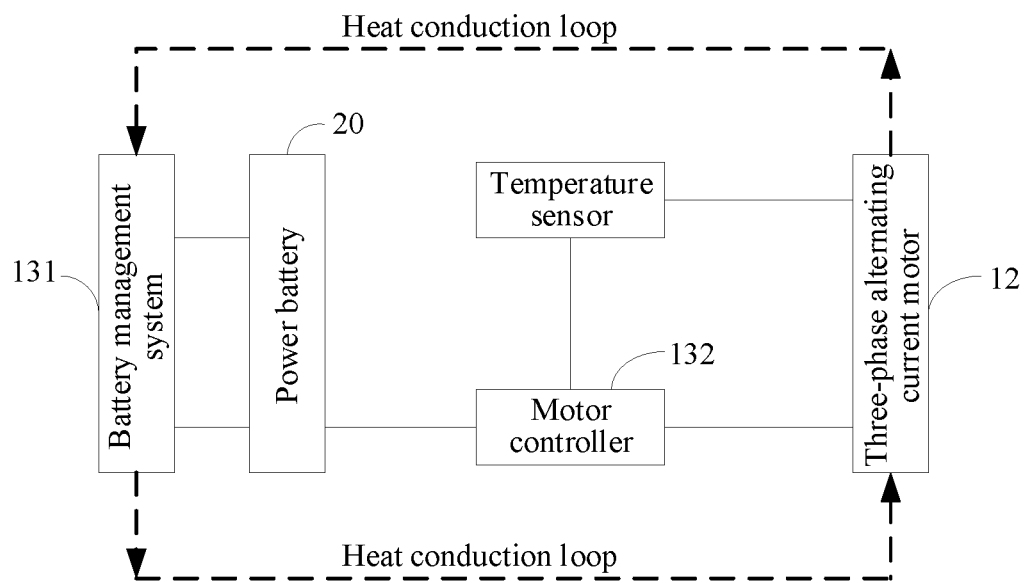
FIG. 4 is another structural diagram of a power battery heating apparatus according to an embodiment of the present disclosure.

During specific implementation, as shown in FIG. 4, the control module 13 includes a battery management system 131 and a motor controller 132. The battery management system 131 is connected to the power battery 20, and the motor controller 132 is connected to the power battery and the three-phase alternating current motor 12. The battery management system 131 obtains a current temperature of the power battery, and compares the current temperature of the power battery with a preset temperature value, to determine whether the power battery is in a low temperature state. When it is detected that the current temperature of the power battery is lower than the preset temperature value, the temperature of the power battery may be raised by raising a temperature of a coolant flowing through the power battery. Because both the three-phase inverter 11 and the three-phase alternating current motor 12 generates heat during operation, the motor controller 132 may control the three-phase inverter 11 and the three-phase alternating current motor 12 to heat the coolant flowing through the power battery, and stop heating until it is detected that the temperature of the power battery reaches the preset temperature value.

Specifically, because both the three-phase inverter 11 and the three-phase alternating current motor 12 generates heat during operation, the motor controller 132 obtains a current working status of the motor of the vehicle, a fault status of the power battery, a fault status of the three-phase alternating current motor 12, a fault status of the motor controller 132, and a fault status of a heat conduction loop, and determines, according to the fault statuses and the current working status of the motor, whether a heating condition of the power battery is met.

It is identified that the heating condition of the power battery meets the preset condition, when determining that the current working status of the motor is a non-driving state, and determining that the fault status of the power battery, the fault status of the three-phase alternating current motor, the fault status of the motor controller, and the fault status of the heat conduction loop all indicate no fault. It is identified that the heating condition of the power battery does not meet the preset condition, when determining that the current working status of the motor is a driving state, or determining that any one of fault status in the fault status of the power battery, the fault status of the three-phase alternating current motor, the fault status of the motor controller, and the fault status of the heat conduction loop indicates that there is a fault.

Further, in an implementation of the present disclosure, when determining that any one of fault status in the fault status of the power battery, the fault status of the three-phase alternating current motor, the fault status of the motor controller, and the fault status of the heat conduction loop indicates that there is a fault, the motor controller 132 is further configured to set the preset direct-axis current id to zero.

When determining that any one of fault status in the fault status of the power battery, the fault status of the three-phase alternating current motor, the fault status of the motor controller, and the fault status of the heat conduction loop indicates that there is a fault, the motor controller 132 is further configured to set the preset quadrature-axis current iq to zero.

Further, when obtaining the current working status of the motor, the motor controller 132 may first obtain gear position information and motor speed information, and obtain the current working status of the motor according to the gear position information and the motor speed information.

Specifically, when the motor controller 132 determines that a current gear position is a P gear position, and a motor speed is zero, it indicates that the current working status of the motor is a non-driving state. When the motor controller 132 determines that the current gear position is not the P gear position, or the motor speed is not zero, it indicates that the current working status of the motor is a driving state. It should be noted that in the embodiments of the present disclosure, there is no sequence between two determining conditions of the working status of the motor and the temperature of the power battery.

In this implementation, when it is detected, in a parking state, that gear position information, motor speed information, and temperature information of the power battery meet a preset condition, the three-phase inverter 11 is controlled to cause the three-phase alternating current motor 12 to heat a coolant flowing through the power battery according to heating energy, to heat the power battery when the vehicle is in the parking state, facilitating that the vehicle may be normally started at a low temperature, and avoiding affecting the performance of the vehicle because the power battery is heated when the vehicle is in a normal traveling state.

Specifically, referring to FIG. 3 and FIG. 4 together, when the motor controller 132 controls the three-phase inverter 11 and the three-phase alternating current motor 12 to heat the coolant flowing through the power battery, the motor controller 132 mainly controls an on/off time and a switching frequency of each power unit in the three-phase inverter 11, to cause the three-phase alternating current motor 12 to generate heat according to heating energy provided by the heating energy source 10 (in this embodiment, for example, the heating energy source is the power battery), to heat a coolant flowing through the power battery. In addition, the motor controller 132 controls, according to the preset direct-axis current id and the preset quadrature-axis current iq, the three-phase inverter 11 to adjust a phase current of the three-phase alternating current motor 12 in the heating process. It should be noted that in this implementation, the power battery is connected to and in communication with the heat conduction loop of the three-phase alternating current motor 12, and a cooling medium flows through a vehicle-used power battery (the power battery) and a vehicle-used power motor (the three-phase alternating current motor 12) by using a pump (not shown in the figure) and a communication valve (not shown in the figure).

Figure 5:
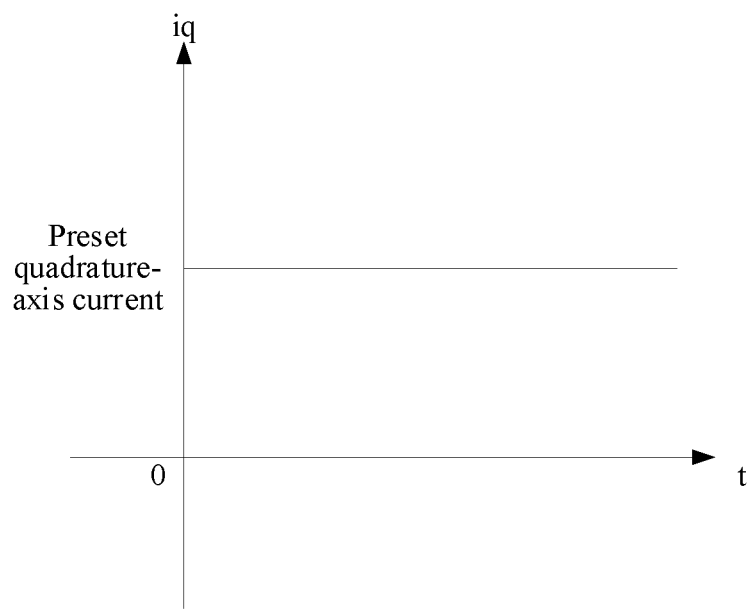
FIG. 5 is a schematic waveform diagram of a preset quadrature-axis current in a power battery heating method according to an embodiment of the present disclosure.

In the process in which the motor controller 132 controls the three-phase inverter 11 to adjust the phase current of the three-phase alternating current motor 12, the preset direct-axis current id is a direct-axis current that is preset according to heating power, and the preset direct-axis current id may control the heating power. However, the preset quadrature-axis current iq is a quadrature-axis current (as shown in FIG. 5) with a constant amplitude value, and the amplitude value is obtained through many experiments, so that electromagnetic torque with a smaller torque value may be outputted at a motor shaft. The electromagnetic torque cannot cause the vehicle to move, and cannot cause a damage to parts and components of a transmission mechanism of the vehicle. It only provides a smaller output torque to complete gap engagement of gears of the transmission mechanism of the vehicle or generate a pre-tightening force.

In this implementation, in the power battery heating apparatus provided in the embodiments of this application, the three-phase inverter 11 and the three-phase alternating current motor 12 are controlled to heat the coolant flowing through the power battery, a preset direct-axis current is controlled according to required heating power in the heating process, and a quadrature-axis current that has an appropriate non-zero amplitude value is given, so that electromagnetic torque with a smaller torque value is outputted at a motor shaft of the three-phase alternating current motor 12 in the heating process of the power battery. The torque cannot cause the vehicle to move, and cannot cause a damage to parts and components of a transmission mechanism of the vehicle. It only provides a smaller output torque to complete gap engagement of gears of the transmission mechanism of the vehicle or generate a pre-tightening force, thereby effectively avoiding jitter of the vehicle in the heating process of the power battery.

Further, in an implementation of this application, when the control module 13 controls the three-phase inverter 11 according to the preset direct-axis current id and the preset quadrature-axis current iq to adjust the phase current of the three-phase alternating current motor 12, the control module 13 needs to obtain a current three-phase current value and position and angle information of a motor rotor of the three-phase alternating current motor 12 before the power battery is heated, and convert the current three-phase current value into a direct-axis current and a quadrature-axis current according to the position and angle information of the motor rotor, to control the three-phase inverter 11 according to the direct-axis current, the quadrature-axis current, the preset direct-axis current, and the preset quadrature-axis current to adjust the phase current of the three-phase alternating current motor 12 in the heating process.

In this implementation, parameters such as a three-phase current value and position and angle information of a motor rotor of the three-phase alternating current motor before the heating are obtained, to obtain a direct-axis current and a quadrature-axis current according to the obtained parameters, to facilitate controlling the three-phase inverter according to the direct-axis current, the quadrature-axis current, the preset direct-axis current, and the preset quadrature-axis current to adjust the phase current of the three-phase alternating current motor in the heating process, so that windings of the three-phase alternating current motor generate a constant amount of heat.

Figure 6:
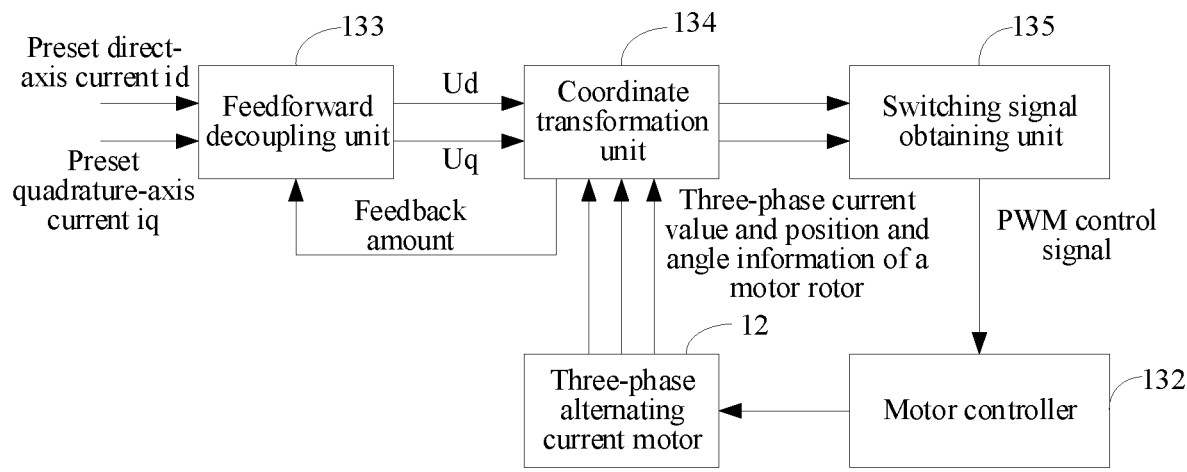
FIG. 6 is a structural diagram of a control module of a power battery heating apparatus according to an embodiment of the present disclosure.

Further, in an implementation of this application, as shown in FIG. 6, the control module 13 further includes a feedforward decoupling unit 133, a coordinate transformation unit 134, and a switching signal obtaining unit 135. The feedforward decoupling unit 133 is connected to the coordinate transformation unit 134, the coordinate transformation unit 134 is connected to the switching signal obtaining unit 135 and the three-phase alternating current motor 12, the switching signal obtaining unit 135 is connected to the motor controller 132, and the motor controller 132 is connected to the three-phase alternating current motor 12.

Specifically, after obtaining the direct-axis current and the quadrature-axis current, the control module 13 respectively compares the direct-axis current and the quadrature-axis current with the preset direct-axis current id and the preset quadrature-axis current iq, to adjust the direct-axis current and the quadrature-axis current according to the preset direct-axis current id and the preset quadrature-axis current iq, thereby controlling the three-phase inverter according to the preset direct-axis current id and the preset quadrature-axis current iq. After the direct-axis current and the quadrature-axis current are adjusted according to the preset direct-axis current id and the preset quadrature-axis current iq, an adjustment result is outputted to the feedforward decoupling unit 133. The feedforward decoupling unit 133 decouples the adjustment result to obtain a direct-axis voltage Ud and a quadrature-axis voltage Uq. The coordinate transformation unit 134 performs coordinate transformation on the direct-axis voltage Ud and the quadrature-axis voltage Uq to obtain a first voltage $U_\alpha$ and a second voltage $U_\beta$. The switching signal obtaining unit 135 obtains a switching signal according to the first voltage $U_\alpha$ and the second voltage $U_\beta$. The motor controller 132 controls the three-phase inverter 11 according to the switching signal to adjust the phase current of the three-phase alternating current motor 12.

In this implementation, the obtained direct-axis current and quadrature-axis current are adjusted according to the preset direct-axis current and the preset quadrature-axis current, to obtain a corresponding adjustment result. A series of changes are performed on the adjustment result to obtain a switching signal of the three-phase inverter, so that the motor controller controls the three-phase inverter according to the switching signal to adjust the phase current of the three-phase alternating current motor, to implement closed-loop control of the three-phase alternating current motor and adjust the heating power, thereby improving the effectiveness in the heating process of the power battery and reducing wear and tear of parts and components such as the motor.

Figure 7:
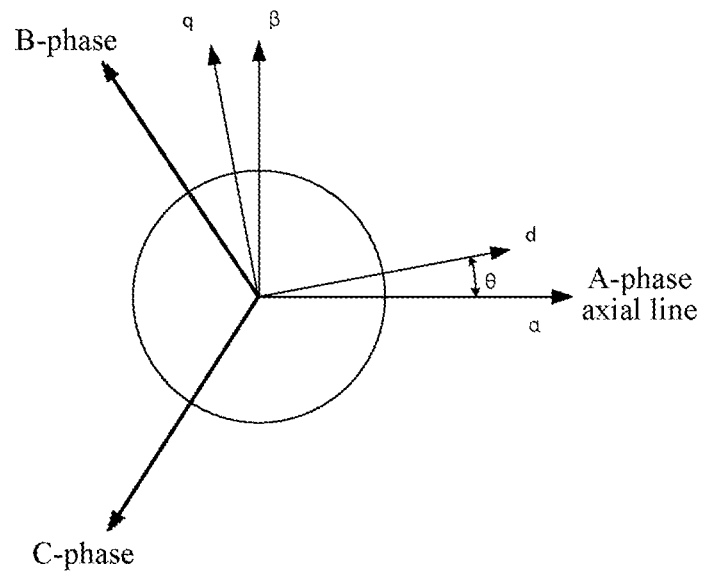
FIG. 7 is a schematic diagram of coordinate transformation in a power battery heating apparatus according to an embodiment of the present disclosure.

Further, in an implementation of this application, a specific process in which the control module 13 obtains the direct-axis current and the quadrature-axis current according to the position and angle information of the motor rotor and the current three-phase current value is:

after the control module 13 obtains the current three-phase current value and the position and angle information of the motor rotor of the three-phase alternating current motor before the power battery is heated, transforming, by the coordinate transformation unit 134, the current three-phase current value from a natural coordinate system to a static coordinate system, and converting the current three-phase alternating current value in the static coordinate system into a direct-axis current and a quadrature-axis current in a synchronous rotating coordinate system according to the position and angle information of the motor rotor (as shown in FIG. 7).

In this implementation, the current three-phase current value is transformed from a natural coordinate system to a static coordinate system, and the current three-phase alternating current value in the static coordinate system is converted into a direct-axis current and a quadrature-axis current in a synchronous rotating coordinate system according to the position and angle information of the motor rotor, so that the control module controls the three-phase inverter according to the obtained direct-axis current and quadrature-axis current to adjust the phase current of the three-phase alternating current motor based on the standard of the same coordinate system, thereby improving the accuracy of the adjustment process.

Further, in an implementation of this application, as shown in FIG. 4, the battery heating apparatus is further provided with a temperature monitoring unit. The temperature monitoring unit is connected to the motor controller 132 in the control module and the three-phase alternating current motor 12. The temperature monitoring unit is configured to monitor temperatures of the three-phase inverter 11 and the three-phase alternating current motor 12 in real time in the heating process of the power battery, and feed back a result of monitoring to the control module 13. If a temperature of either of the three-phase inverter 11 and the three-phase alternating current motor 12 exceeds a temperature threshold, the control module 13 reduces the preset direct-axis current id, or sets the preset direct-axis current id to zero.

If the temperature of either of the three-phase inverter 11 and the three-phase alternating current motor 12 exceeds the temperature threshold, the control module 13 is further configured to set the preset quadrature-axis current iq to zero.

During specific implementation, the temperature monitoring unit is implemented by using a temperature sensor. The temperature sensor may be implemented by using a negative temperature coefficient thermistor, or may be implemented by using a positive temperature coefficient thermistor, which is not specifically limited herein.

In the embodiments of the present disclosure, in the heating process of the power battery, any device may be damaged when an excessively high temperature. Therefore, temperatures of the three-phase alternating current motor and the power device in the three-phase inverter need to be monitored in real time. If it is detected that a temperature of either of the three-phase inverter and the three-phase alternating current motor exceeds a temperature threshold, a current amplitude value of the preset direct-axis current id is reduced or the preset direct-axis current id and the preset quadrature-axis current iq are set to zero.

In this implementation, in the heating process of the power battery, temperatures of the three-phase inverter and the three-phase alternating current motor are monitored in real time, so that when a temperature of either of the three-phase inverter and the three-phase alternating current motor exceeds a temperature threshold, the preset direct-axis current id is reduced, or the preset direct-axis current id and the preset quadrature-axis current iq are set to zero, and values of phase currents flowing through three phase windings of the three-phase alternating current motor are also reduced or become zero. In this way, the heating power of the motor is reduced, and thus a temperature of a power unit in the three-phase inverter and temperatures of the three phase windings of the three-phase alternating current motor are reduced, so that all the parts and components of the vehicle are not damaged while ensuring the heating effect.

Further, in an implementation of the present disclosure, as shown in FIG. 4, the control module 13 is further configured to monitor a temperature of the power battery in real time in the heating process of the power battery, and stop heating the power battery if the temperature of the power battery reaches a specified heating temperature.

In the embodiments of the present disclosure, when a temperature of the power battery reaches a specified heating temperature, it indicates that there is no need to heat the power battery. In this case, it needs to stop heating the power battery, that is, reduce a direct-axis current and a quadrature-axis current.

In this implementation, a temperature of the power battery is monitored in real time in the heating process, and when the temperature of the power battery reaches a specified heating temperature, the preset direct-axis current and the preset quadrature-axis current are reduced, to effectively avoid overheating of the power battery, and avoid a damage to the power battery, thereby prolonging the service life of the power battery.

Further, in an implementation of the present disclosure, as shown in FIG. 4, the control module 13 is further configured to obtain required heating power of the power battery in real time in the heating process of the power battery, and adjust a value of the preset direct-axis current id according to the required heating power.

In the embodiments of the present disclosure, as the heating process goes on, the temperature of the power battery constantly rises, and the rising of the temperature causes heating power required by the power battery to change constantly. Therefore, in the heating process of the power battery, required heating power of the power battery needs to be obtained in real time, and a value of the preset direct-axis current id needs to be adjusted according to the required heating power.

In this implementation, required heating power of the power battery is obtained in real time in the heating process, and the preset direct-axis current id is adjusted according to the required heating power, to effectively avoid overheating of the power battery, and avoid a damage to the power battery, thereby prolonging the service life of the power battery.

The technical solutions of this application are described below by using specific circuit structures.

In a cold environment, when the vehicle is not used for a long time, a temperature of a vehicle-used power battery approaches an ambient temperature. With the decrease of the temperature, the performance of the vehicle-used power battery is further reduced, thereby limiting charging and discharging capabilities and further affecting the performance and use of the new-energy vehicle. Therefore, the power battery needs to be heated.

Referring to FIG. 3 and FIG. 4 together, during heating of the power battery, when the battery management system 131 monitors that the temperature of the power battery is excessively low, a standby state at which the three-phase alternating current motor 12 heats the power battery is entered. In this case, the control module 13 needs to determine a heating condition, that is, determines whether the temperature of the power battery is excessively low, whether a motor speed is zero, and whether a gear position is a P gear position. If all determination results of the heating condition are true, a process of generating heat by using the three-phase alternating current motor 12 to heat the power battery may be performed.

During heating, a sensor first performs signal sampling on each current variable of the motor, and transmits a sampling result to the control module 13. Sampled variables are mainly a three-phase current value that currently flows through windings of the three-phase alternating current motor 12 and position and angle information of a motor rotor (a current rotor position of the motor). As shown in FIG. 6, after the three-phase current value and the position and angle information of the motor rotor are obtained, the coordinate transformation unit 134 converts variables in a natural coordinate system ABC into variables in a static coordinate system α-β through clark transformation, and then converts the variables in the static coordinate system α-β into variables in a synchronous rotating coordinate system d-q through park transformation. In addition, a condition that an amplitude value is constant is followed in the entire coordinate transformation, and a transformation coefficient 2/3 is added in front of a transformation matrix.

Specifically, when the coordinate transformation unit 134 converts the variables in the natural coordinate system ABC into the variables in the static coordinate system α-β, the variables in the natural coordinate system ABC is converted according to a transformation matrix $$T_{3s/2s} = \frac{2}{3}\begin{bmatrix} 1 & -0.5 & -0.5 \\ 0 & \frac{\sqrt{3}}{2} & -\frac{\sqrt{3}}{2} \\ \frac{\sqrt{2}}{2} & \frac{\sqrt{2}}{2} & \frac{\sqrt{2}}{2} \end{bmatrix}.$$

When the coordinate transformation unit 134 converts the variables in the static coordinate system α-β into the variables in the synchronous rotating coordinate system d-q, the variables in the static coordinate system α-β is converted according to a transformation matrix $$T_{2s/2r} = \begin{bmatrix} \cos\theta & \sin\theta \\ -\sin\theta & \cos\theta \end{bmatrix}.$$

Then, the two transformation matrices are multiplied, to obtain a transformation matrix $$T_{3s/2r} = \frac{2}{3}\begin{bmatrix} \cos\theta & -\sin\theta & 0.5 \\ \cos\left(\theta - \frac{2}{3}\pi\right) & -\sin\left(\theta - \frac{2}{3}\pi\right) & 0.5 \\ \cos\left(\theta + \frac{2}{3}\pi\right) & -\sin\left(\theta + \frac{2}{3}\pi\right) & 0.5 \end{bmatrix}$$

from the natural coordinate system ABC to the synchronous rotating coordinate system d-q. θ in the formula is an angle (the position and angle information of the motor rotor) between a direct rotor axis of the three-phase alternating current motor 12 and an A-phase winding of the three-phase alternating current motor 12. A three-phase current in the natural coordinate system ABC may be converted into a quadrature-axis current and a direct-axis current through the transformation matrix $T_{3s/2r}$. The direct-axis current is an exciting current, and the quadrature-axis current is a torque current, that is, on the premise of complete coupling, only the quadrature-axis current is related to torque outputted at a motor shaft. Therefore, in the process of heating the power battery by using the three-phase alternating current motor 12, output of torque at the motor shaft may be controlled by controlling the quadrature-axis current.

It may be seen according to a calculation formula $T_e = 3/2 p \cdot i_q [\varphi_f + (L_d - L_q) \cdot i_d]$ of torque outputted at the motor shaft of the three-phase alternating current motor 12 that, when a quadrature-axis current is equal to zero, there is no torque outputted by the motor shaft. However, during actual use, to control the quadrature-axis current to be zero, that is, to not generate electromagnetic torque of the motor, a zero position of the motor needs to be accurately obtained, and a sampling precision of a three-phase current sensor needs to be ensured. Limited to factors such as the accuracy of a motor zero position calibration method and the difficulty in ensuring a good sampling precision of the three-phase current sensor when a current amplitude value is smaller, if the zero position of the motor is inaccurate, or a good sampling precision of the three-phase current sensor is difficult to be ensured when a current amplitude value is smaller, a control algorithm cannot control the quadrature-axis current to be always zero, and thus a quadrature-axis current value oscillates around zero, causing the entire vehicle jitters. In different working conditions, jitter strength is also different. If there is an occupant in the vehicle at this time, a bad driving experience is generated. To eliminate such a defect, in this application, an amplitude value of the preset direct-axis current id is controlled in real time to be a value corresponding to required heating power, and an amplitude value of the preset quadrature-axis current iq is controlled to be an appropriate constant value. The value cannot make the occupant feel that the vehicle is moving or jittering, nor cause a potential damage to the transmission mechanism of the vehicle, but only torque with a smaller amplitude value is outputted at a motor shaft, which falls within an acceptable range of the mechanical strength of the transmission mechanism. In this way, an effect similar to a pre-tightening force is generated, eliminating an engagement gap between transmission mechanisms. Therefore, it may ensure that the occupant feels good, and the vehicle normally completes heating of the power battery. $T_e$ indicates torque outputted at the motor shaft, p indicates a quantity of pole pairs, $\varphi_f$ indicates a permanent magnet flux linkage of the motor, $L_d$ indicates a direct-axis inductance, $L_q$ indicates a quadrature-axis inductance, $i_d$ indicates a direct-axis current, and $i_q$ indicates a quadrature-axis current.

After a quadrature-axis current and a direct-axis current are obtained by performing coordinate transformation on acquired variables, the quadrature-axis current and the direct-axis current may be respectively compared with the preset quadrature-axis current iq and the preset direct-axis current id, and a comparison result is fed back to the feedforward decoupling unit 133. The feedforward decoupling unit 133 performs complete decoupling on the variables in a feedforward compensation manner. After the decoupling is completed, an obtained direct-axis voltage (Ud) and quadrature-axis voltage (Uq) are further transmitted to the coordinate transformation unit 134, and voltage variables $U_\alpha$ and $U_\beta$ in a static coordinate system are obtained by using an inversed park transformation matrix $$T_{2r/2s} = \begin{bmatrix} \cos\theta & -\sin\theta \\ \sin\theta & \cos\theta \end{bmatrix}.$$

Subsequently, $U_\alpha$ and $U_\beta$ are transmitted to the switching signal obtaining unit 135, and the switching signal obtaining unit 135 obtains, by using a space vector pulse width modulation (SVPWM) algorithm, six switching signals for controlling the three-phase inverter 11. The motor controller 132 controls, by using the six switching signals, power switching units in the three-phase inverter 11 to perform on/off actions, so as to control a three-phase current value flowing through the three-phase alternating current motor.

Further, in the entire heating process, a temperature sensor constantly monitors temperatures of windings of the three-phase alternating current motor and power switches of the three-phase inverter. If any of them exceeds a temperature threshold, or a current temperature of the power battery gradually approaches a pre-determined target heating temperature, or the current temperature of the power battery has reached or exceeds the pre-determined target heating temperature, the motor controller reduces the given id value or sets id or iq to zero. Therefore, values of phase currents flowing through three phase windings of the three-phase alternating current motor are also reduced or become zero, and heating power of the motor is also reduced, so that temperatures of the power switches of the three-phase inverter and temperatures of the windings of the three-phase alternating current motor are also reduced. Therefore, all parts and components of the vehicle are not damaged while ensuring the heating effect, until the windings of the three-phase alternating current motor and the power switches of the three-phase inverter are not in an over-temperature state. In this case, if the temperature of the power battery has reached the pre-determined heating temperature, heating is stopped; and if the temperature of the power battery has not reached the pre-determined heating temperature, heating continues to be performed. If in the entire heating process, the windings of the three-phase alternating current motor and the power switching devices are not over-heated, the battery management system transmits a heating stop instruction when monitoring that the temperature of the battery has reached the pre-determined heating temperature. In this case, the process in which the three-phase alternating current motor generates heat to heat the vehicle-used power battery ends.

Figure 8:
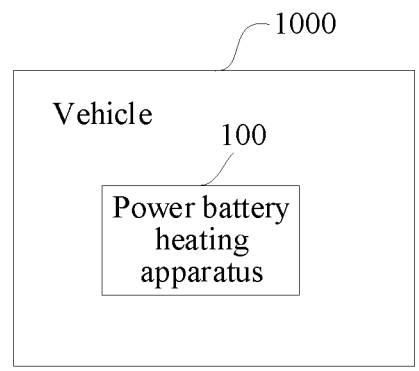
FIG. 8 is a schematic block diagram of a vehicle according to an embodiment of the present disclosure.

As shown in FIG. 8, another embodiment of this application provides a vehicle 1000. The vehicle 1000 includes the power battery heating apparatus 100 in the foregoing embodiment, and further includes a power battery, a coolant tank, a pump, and a water pipeline. The pump inputs a coolant in the coolant tank into the water pipeline according to a control signal, and the water pipeline passes through the power battery and the power battery heating apparatus 100.

In the vehicle provided in this application, when a current temperature value of a power battery is lower than a preset temperature value, and a heating condition of the power battery meets a preset condition, a three-phase inverter is controlled to cause a three-phase alternating current motor to generate heat according to heating energy, to heat a coolant flowing through the power battery. A preset quadrature-axis current that causes a torque value outputted by the motor to be an appropriate value is obtained, and a corresponding preset direct-axis current is obtained according to heating power of the power battery, to control, according to the preset direct-axis current and the preset quadrature-axis current, the three-phase inverter to adjust a phase current of the three-phase alternating current motor in the heating process, so that electromagnetic torque with a small torque value is outputted at a motor shaft. The electromagnetic torque cannot cause the vehicle to move, and cannot cause a damage to parts and components of a transmission mechanism of the vehicle. It only causes the motor output shaft to output a pre-tightening force to the transmission mechanism, thereby eliminating an engagement gap and effectively avoiding jitter of the vehicle.

The foregoing embodiments are merely used for describing the technical solutions of this application, but are not intended to limit this application. Although this application is described in detail with reference to the foregoing embodiments, a person of ordinary skill in the art should understand that, modifications may still be made to the technical solutions in the foregoing embodiments, or equivalent replacements may be made to some of the technical features; and these modifications or replacements will not cause the essence of corresponding technical solutions to depart from the spirit and scope of the technical solutions in the embodiments of this application, and shall fall within the protection scope of this application.

What is claimed is:

1. A power battery heating method, configured for heating a power battery of a vehicle having a three-phase alternating current motor, a motor controller, and a heat conduction loop, the power battery heating method comprising:
   obtaining a current temperature value of the power battery, and determining whether the current temperature value of the power battery is lower than a preset temperature value;
   determining whether a current working status of the three-phase alternating current motor is a non-driving state, and whether one of the power battery, the three-phase alternating current motor, the motor controller, or the heat conduction loop is faulty;
   in response to determining that the current temperature value of the power battery is lower than the preset temperature value, that the current working status of the three-phase alternating current motor is a non-driving state, and that none of the power battery, the three-phase alternating current motor, the motor controller, or the heat conduction loop is faulty, obtaining heating power of the power battery;
   obtaining a preset quadrature-axis current, and obtaining a corresponding preset direct-axis current according to the heating power of the power battery, wherein a value of the obtained preset quadrature-axis current is a quadrature-axis current value that causes a torque value outputted by a three-phase alternating current motor to fall within a target range, and the target range does not comprise zero; and
   controlling an on/off status of a power device in a three-phase inverter, so that the three-phase alternating current motor generates heat according to heating energy provided by a heating energy source to heat a coolant flowing through the power battery, and controlling, according to the preset direct-axis current and the preset quadrature-axis current, the three-phase inverter to adjust a phase current of the three-phase alternating current motor in a heating process of the power battery.

2. The power battery heating method according to claim 1, further comprising:
   obtaining gear position information and motor speed information, and obtaining the current working status of the three-phase alternating current motor according to the gear position information and the motor speed information.

3. The power battery heating method according to claim 1, further comprising: setting the preset direct-axis current to zero in response to determining that any one of the power battery, the three-phase alternating current motor, the motor controller, and the heat conduction loop is faulty.

4. The power battery heating method according to claim 3, wherein in response to determining that any one of the power battery, the three-phase alternating current motor, the motor controller, and the heat conduction loop is faulty, the power battery heating method further comprises:
   setting the preset quadrature-axis current to zero.

5. The power battery heating method according to claim 1, further comprising:

monitoring temperatures of the three-phase inverter and the three-phase alternating current motor in real time in the heating process of the power battery, and in response to determining that a temperature of either one of the three-phase inverter and the three-phase alternating current motor exceeds a temperature threshold, reducing the preset direct-axis current or setting the preset direct-axis current to zero.

6. The power battery heating method according to claim 5, wherein in response to determining the temperature of either one of the three-phase inverter and the three-phase alternating current motor exceeds the temperature threshold, the power battery heating method further comprises:
setting the preset quadrature-axis current to zero.

7. The power battery heating method according to claim 1, further comprising:
monitoring a temperature of the power battery in real time in the heating process of the power battery, and reducing the preset direct-axis current if the temperature of the power battery reaches a specified heating temperature.

8. The power battery heating method according to claim 1, further comprising:
obtaining a current three-phase current value and position and angle information of a motor rotor of the three-phase alternating current motor before the power battery is heated, and
converting the current three-phase current value into a direct-axis current and a quadrature-axis current according to the position and angle information of the motor rotor, to control, according to a difference between the direct-axis current and the preset direct-axis current and a difference between the quadrature-axis current and the preset quadrature-axis current, the three-phase inverter to adjust the phase current of the three-phase alternating current motor in the heating process of the power battery.

9. The power battery heating method according to claim 1, wherein the heating energy source is at least one of an external charging device and the power battery.

10. A power battery heating apparatus, configured to heat a power battery of a vehicle, the power battery heating apparatus comprising:
a three-phase inverter, connected to a positive electrode and a negative electrode of a heating energy source configured to provide heating energy;
a three-phase alternating current motor, wherein three phase coils of the three-phase alternating current motor are connected to three phase legs of the three-phase inverter; and
a control circuit, wherein the control circuit is connected to the three-phase inverter and the three-phase alternating current motor, and is configured to:
obtain a current temperature value of the power battery;
determine whether the current temperature value of the power battery is lower than a preset temperature value;
determine whether a current working status of the three-phase alternating current motor is a non-driving state, and whether one of the power battery, the three-phase alternating current motor, a motor controller, or a heat conduction loop is faulty;
in response to determining that the current temperature value of the power battery is lower than the preset temperature value, that the current working status of the three-phase alternating current motor is a non-driving state, and that none of the power battery, the three-phase alternating current motor, the motor controller, or the heat conduction loop is faulty, obtain heating power of the power battery;
obtain a preset quadrature-axis current, and obtain a corresponding preset direct-axis current according to the heating power of the power battery, wherein a value of the obtained preset quadrature-axis current is a quadrature-axis current value that causes a torque value outputted by the three-phase alternating current motor to fall within a target range, and the target range does not comprise zero; and
control an on/off status of a power device in the three-phase inverter, so that the three-phase alternating current motor generates heat according to the heating energy provided by the heating energy source, to heat a coolant flowing through the power battery, and control, according to the preset direct-axis current and the preset quadrature-axis current, the three-phase inverter to adjust a phase current of the three-phase alternating current motor in a heating process of the power battery.

11. The power battery heating apparatus according to claim 10, wherein the control circuit is further configured to:
obtain gear position information and motor speed information, and obtain the current working status of the three-phase alternating current motor according to the gear position information and the motor speed information.

12. The power battery heating apparatus according to claim 10, wherein the control circuit is further configured to:
set the preset direct-axis current to zero in response to determining that any one of the power battery, the three-phase alternating current motor, the motor controller, and the heat conduction loop is faulty.

13. The power battery heating apparatus according to claim 12, wherein the control circuit is further configured to:
set the preset quadrature-axis current to zero in response to determining that any one of the power battery, the three-phase alternating current motor, the motor controller, and the heat conduction loop is faulty.

14. The power battery heating apparatus according to claim 10 further comprising:
a temperature monitoring unit, wherein the temperature monitoring unit is connected to the control circuit and the three-phase alternating current motor, and is configured to monitor temperatures of the three-phase inverter and the three-phase alternating current motor in real time in the heating process of the power battery, and feed back a result of monitoring to the control circuit, and in response to that a temperature of either one of the three-phase inverter and the three-phase alternating current motor exceeds a temperature threshold, the control circuit reduces the preset direct-axis current or sets the preset direct-axis current to zero.

15. The power battery heating apparatus according to claim 14, wherein in response to determining that the temperature of either one of the three-phase inverter and the three-phase alternating current motor exceeds the temperature threshold, the control circuit is further configured to: set the preset quadrature-axis current to zero.

16. The power battery heating apparatus according to claim 10, wherein the control circuit is further configured to:
monitor a temperature of the power battery in real time in the heating process of the power battery, and reduce the preset direct-axis current if the temperature of the power battery reaches a specified heating temperature.

17. The power battery heating apparatus according to claim 10, wherein the control circuit is further configured to:
obtain a current three-phase current value and position and angle information of a motor rotor of the three-phase alternating current motor before the power battery is heated, and convert the current three-phase current value into a direct-axis current and a quadrature-axis current according to the position and angle information of the motor rotor, to control, according to a difference between the direct-axis current and the preset direct-axis current and a difference between the quadrature-axis current and the preset quadrature-axis current, the three-phase inverter to adjust the phase current of the three-phase alternating current motor in the heating process of the power battery.

18. A vehicle, comprising a power battery heating apparatus, a power battery, a coolant tank, a pump, and a water pipeline, wherein
the pump drives a coolant in the coolant tank into the water pipeline according to a control signal,
the water pipeline passes through the power battery and the power battery heating apparatus, and
the power battery heating apparatus comprises:
a three-phase inverter, connected to a positive electrode and a negative electrode of a heating energy source configured to provide heating energy;
a three-phase alternating current motor, wherein three phase coils of the three-phase alternating current motor are connected to three phase legs of the three-phase inverter; and
a control circuit, wherein the control circuit is connected to the three-phase inverter and the three-phase alternating current motor, and is configured to:
obtain a current temperature value of the power battery;
determine whether the current temperature value of the power battery is lower than a preset temperature value;
determine whether a current working status of the three-phase alternating current motor is a non-driving state, and whether one of the power battery, the three-phase alternating current motor, a motor controller, or a heat conduction loop is faulty;
in response to determining that the current temperature value of the power battery is lower than the preset temperature value, that the current working status of the three-phase alternating current motor is a non-driving state, and that none of the power battery, the three-phase alternating current motor, the motor controller, or the heat conduction loop is faulty, obtain heating power of the power battery;
obtain a preset quadrature-axis current, and obtain a corresponding preset direct-axis current according to the heating power of the power battery, wherein a value of the obtained preset quadrature-axis current is a quadrature-axis current value that causes a torque value outputted by the three-phase alternating current motor to fall within a target range, and the target range does not comprise zero; and
control an on/off status of a power device in the three-phase inverter, so that the three-phase alternating current motor generates heat according to the heating energy provided by the heating energy source, to heat the coolant flowing through the power battery, and control, according to the preset direct-axis current and the preset quadrature-axis current, the three-phase inverter to adjust a phase current of the three-phase alternating current motor in a heating process of the power battery.

\* \* \* \* \*